United States Patent [19]

MacMillan

[11] 3,709,280

[45] Jan. 9, 1973

[54] METHOD OF MANUFACTURING A CONDUCTION HEATER

[75] Inventor: Kenneth T. MacMillan, Macon, Ga.

[73] Assignee: MacMillan Mold Company, Inc., Macon, Ga.

[22] Filed: Sept. 18, 1970

[21] Appl. No.: 73,509

[52] U.S. Cl..................................164/112, 164/334
[51] Int. Cl. ............................................B22d 19/00
[58] Field of Search ..164/98, 112, 332, 334; 249/91, 249/93

[56] References Cited

UNITED STATES PATENTS

| 3,064,112 | 11/1962 | Hanzel | 164/98 X |
| 3,096,566 | 7/1963 | Jepson | 164/112 X |
| 3,098,921 | 7/1963 | Jepson | 164/108 X |

FOREIGN PATENTS OR APPLICATIONS

| 633,172 | 12/1961 | Canada | 164/112 |
| 188,596 | 11/1922 | Great Britain | 164/108 |

Primary Examiner—R. Spencer Annear
Attorney—Diller, Brown, Ramik & Holt

[57] ABSTRACT

A conduction heater preferably formed as an annular matrix or heater plate for tire recapping and vulcanizing equipment. The heater or matrix is formed by positioning a generally circular hollow tube within an annular cavity, supporting the circular element for sliding movement relative to the cavity, filling the cavity with molten metal, and solidifying the molten metal whereby the relative sliding movement prevents the circular element from rupturing during manufacture and use due to different coefficients of expansion of the material from which the circular element is constructed and the molten metal forming the matrix body upon the solidification thereof. In further accordance with the present method, ends of the circular element are closed by plugs disposed tangentially of the annular cavity whereby upon the solidification of the molten metal and the removal of the plugs thereafter, the ends of the circular element are accessible through tangential voids in a peripheral surface portion of the matrix whereby steam and/or electrical fitments may be secured to the exposed ends of the circular element.

19 Claims, 7 Drawing Figures

INVENTOR
KENNETH T. MacMILLAN
ATTORNEYS

PATENTED JAN 9 1973 3,709,280
SHEET 2 OF 2
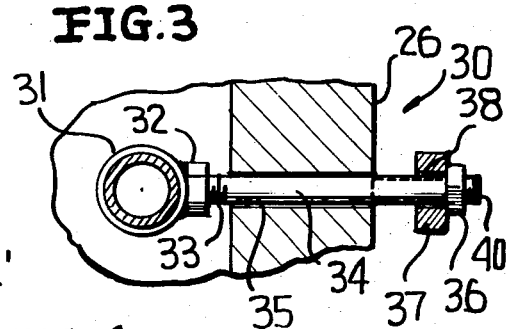
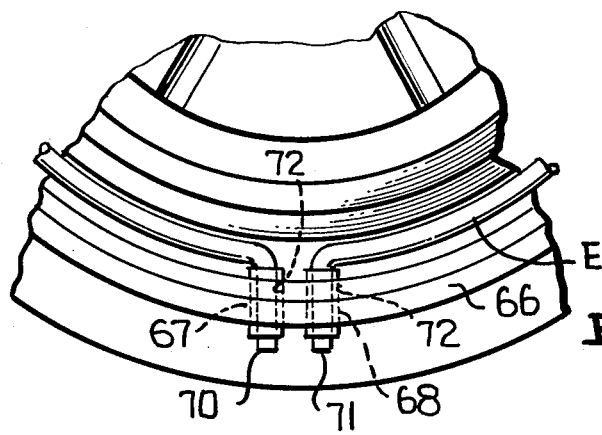
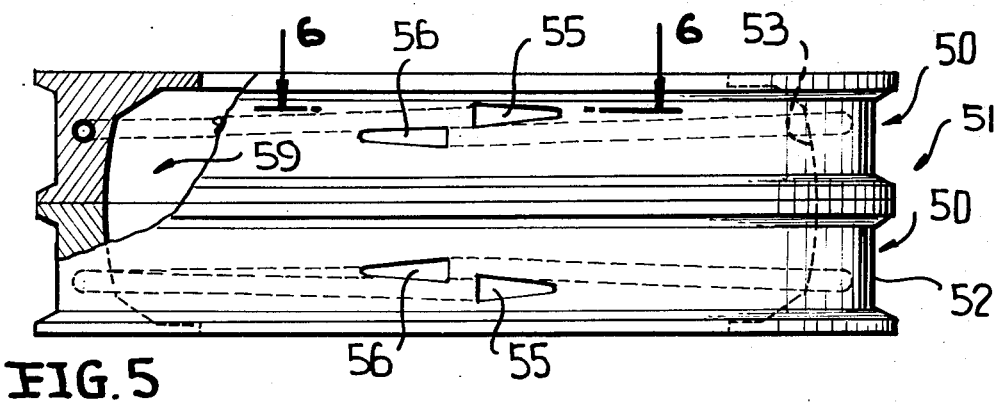
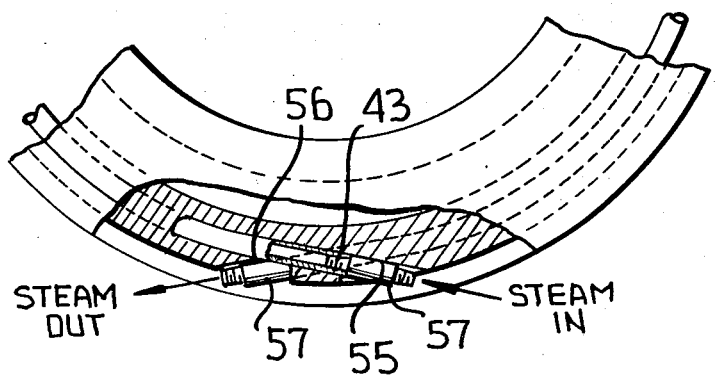
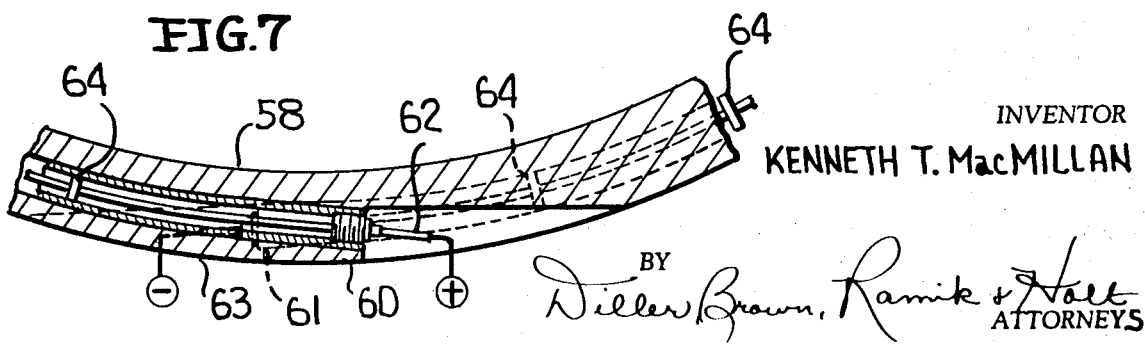
INVENTOR
KENNETH T. MacMILLAN
BY
Diller Brown, Ramik & Holt
ATTORNEYS

METHOD OF MANUFACTURING A CONDUCTION HEATER

It is conventional in the recapping and vulcanizing industry to employ annular tire molds or matrices which are generally of an annular configuration defined by inner and outer peripheral surface portions, the former of which defines a mold cavity. The cavity is provided with a desired tread design such that during a recapping operation, as an example, a tire with camel back thereon when positioned in the cavity and cured will assume the mirror image configuration of the tread design.

The curing is generally accomplished by passing steam through ports in the matrix or connecting embedded heaters in the matrix to a suitable source of electrical energy. If, as is the usual case, the ports of the matrix are formed by hollow tubes about which has been cast molten metal which subsequently is permitted to solidify, the initial heating of the tubes results in the expansion thereof, and after the curing operation cold water introduced into the tubes results in contraction. Where the tubes are constructed from, for example, steel and the matrix casing or body is formed from aluminum, the difference in the coefficient of expansion of these metals results in the rupture of the tubes, and more particularly inlet and outlet fitments which are conventionally welded to the tube ends. Moreover, such relative expansion and contraction can even fracture the fitments during the molding of the matrices.

It is also the present practice in the industry of curing tires and matrices by employing either steam or electricity, and more particularly either by embedding cal-rod or similar type heaters in the matrix casting or a tube which is adapted for connection to a source of steam, hot water or the like. However, at present there are no commercially available matrices which, at the choice of the user, can be alternatively and selectively heated by electricity, steam, hot water or a similarly heated medium.

In keeping with the foregoing, it is a primary object of the present invention to provide a novel heater though particularly designed as an annular heater plate or matrix for the recapping and vulcanizing of tires, is equally applicable for use in other fields. The heater may be designed as a frying pan, a percolator or similar heating plate, an electric iron and most any type heater in which a heating element is normally cast directly into metal bodies which are to be heated or is insertable in cast metal bodies having appropriate openings to receive the heater elements.

Turning first to the objects of the method of manufacturing the novel heating device of the present invention, a mold is provided having a cavity of a predetermined configuration in which is positioned an element supported for sliding movement relative to the mold cavity. The cavity is then filled with molten metal, and during the filling, solidification, and subsequent use of the heating device, the sliding movement between the casting or heater body and the element prevents rupture of the latter due to any differential expansion and/or contraction due to different coefficients of expansion of the metals forming the casting and the element.

A further object of this invention is to provide a novel method of the type aforesaid wherein the cavity is of an annular configuration, the element is of a generally circular configuration, and ends of the circular element project tangentially outwardly of the cavity whereby abrupt bends which would normally be subjected to the greatest stresses during expansion and/or contraction are eliminated.

Still another object of this invention is to provide a novel method of the type set forth wherein the circular element is tubular and is wholly housed within the cavity, and the ends of the circular element are temporarily plugged by a vented insert whereby pressure build-up internally of the hollow element is precluded during the casting operation to prevent the rupture thereof.

A further object of this invention is to provide a novel method wherein inserts are preferably disposed tangentially to the mold cavity whereby upon the solidification of the molten metal and the removal of the insert ends of the hollow element are exposed through tangential voids in the casting or heater body.

Another object of the present invention is to provide a novel device for the conductive heating and/or cooling of an article which preferably, though not necessarily, includes an annular metallic casting, the shape of the casting depending upon the desired use of the device, a hollow element substantially encapsulated by the casting, a portion of the hollow element being exposed by a void in the casting, and means mounting the hollow element for relative sliding movement relative to the casting whereby differential expansion and/or contraction of the hollow element and the metallic casting precludes the hollow element from being damaged.

A further object of the present invention is to provide a novel device of the type heretofore mentioned wherein the hollow element is tubular and circular, and the mounting means includes a plurality of sleeves exteriorly surrounding the hollow element and being embedded within the casting.

Another object of this invention is to provide a novel heater device of the type mentioned wherein terminal end portions of the hollow element are disposed in generally tangential relationship to the casting which is of a generally angular configuration, and the ends of the hollow element are in communication with atmosphere through tangential voids in the outer peripheral surface of the annular casting.

With the above and other objects in view that will hereinafter appear, the nature of the invention will be more clearly understood by reference to the following detailed description, the appended claimed subject matter, and the several views illustrated in the accompanying drawings.

In the drawings:

FIG. 3 is an enlarged fragmentary sectional view taken generally along line 3—3 of FIG. 2, and illustrates one of the mounting means in the form of a sleeve exteriorly surrounding a portion of the hollow element and being supported within the cavity by a removable bolt passed through aperture in the mold and threaded into a nut welded to the sleeve.

FIG. 4 is a fragmentary top plan view of the mold of FIG. 2, and illustrates a modification wherein the ends of the circular hollow tubular element are radially disposed with respect to the mold and are mounted for relative sliding movement by asbestos sleeves housed within radial openings of the mold body.

Figure 1:
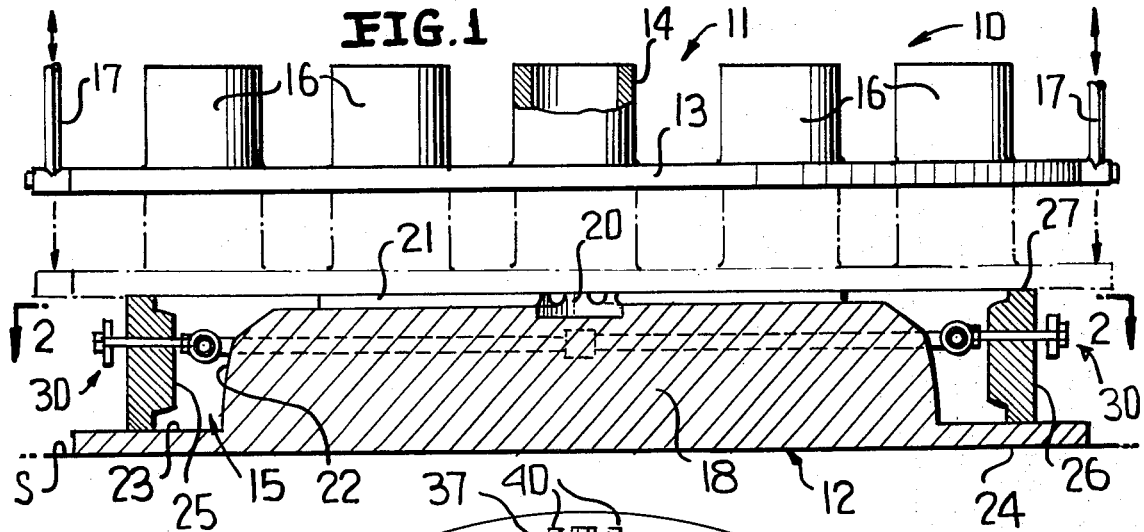
FIG. 1 is a side elevational view of a mold in which the conductive heater or matrix of the present invention is formed, with portions thereof being shown in section for clarity, and illustrates an annular cavity within which is supported a generally circular hollow tubular element.
Figure 2:
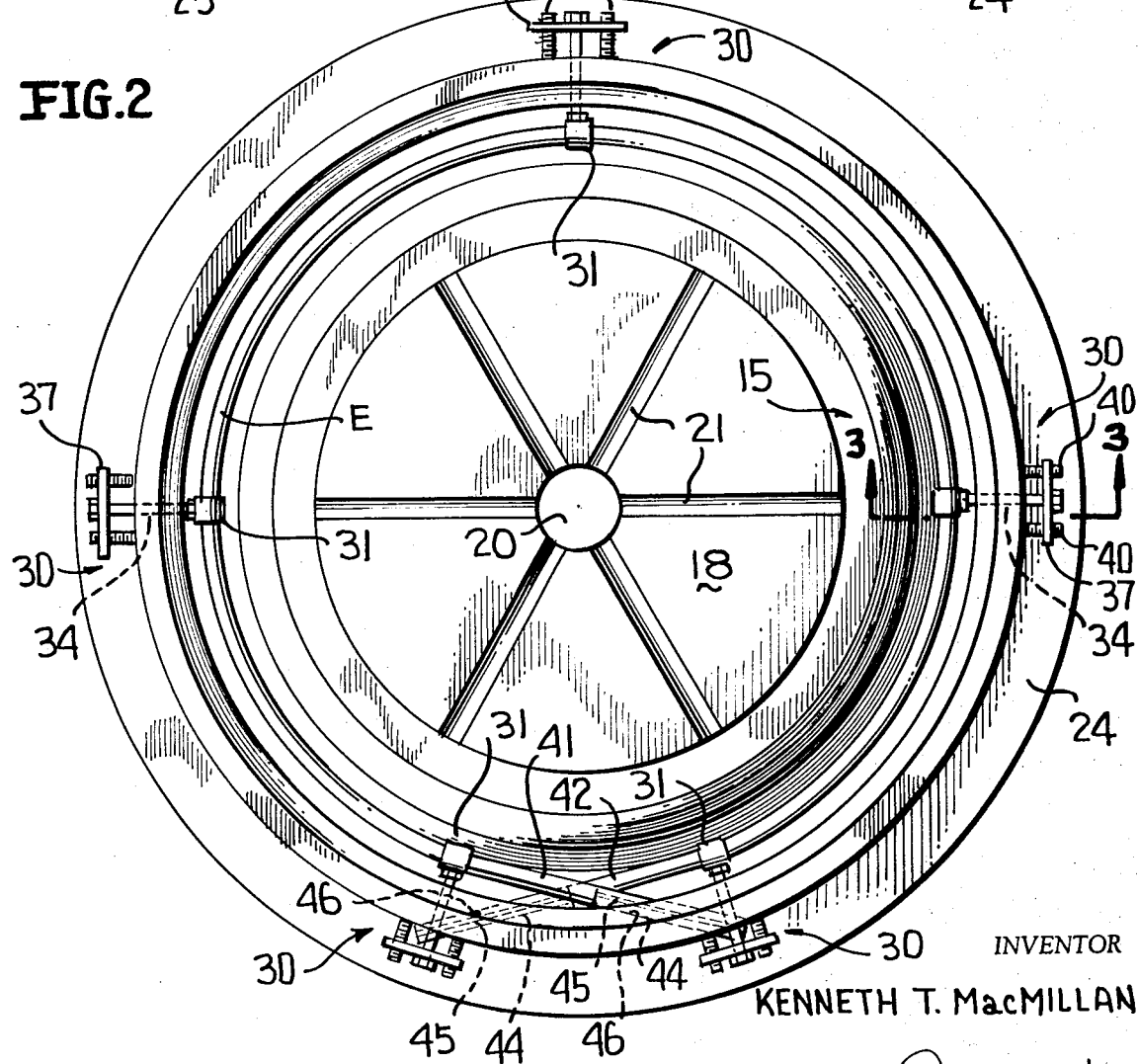
FIG. 2 is a top plan view taken along line 2—2 of FIG. 1, and illustrates a plurality of means mounting the hollow element for sliding movement relative to the mold cavity, as well as the casting eventually formed therein, and also illustrates tangentially disposed ends of the hollow element closed by venting plugs.

FIG. 5 is a side elevational view of two matrix halves formed in the mold of FIGS. 1 and 2, with portions thereof removed for clarity, and illustrates the manner in which the halves define a matrix cavity in which an article may be heated and/or cooled by introducing a heated medium into the hollow elements through the exposed ends or inserting therein a heater adapted for connection to a source of electrical energy.

FIG. 6 is a fragmentary sectional view taken generally along line 6—6 of FIG. 5, and illustrates the manner in which fitments are secured to exposed ends of the hollow elements through tangential voids or openings in the outer peripheral surface of each of the matrix halves.

FIG. 7 is an enlarged fragmentary sectional view similar to FIG. 6, and illustrates a heating element housed within the tubular element with ends thereof exposed for connection to a source of electrical energy.

Reference is first made to FIGS. 1 through 3 of the drawings which illustrate a mold 10 formed by an upper mold half 11 and a lower mold half 12.

The upper mold half 11 includes a generally circular plate 13 having at its axis a tubular gate 14 in which molten metal is poured to fill a cavity 15 defined by the lower mold half 12. About the periphery (unnumbered) of the plate 13 of the upper mold half 11 are disposed a plurality of circumferentially spaced tubular risers 16 that feed the casting as it solidifies in a conventional manner. There are six such risers 16 equally spaced about the periphery of the plate 13, but the number thereof may vary depending upon the size, shape, design, etc. of the mold cavity 15. Suitable means (not shown) are connected to tie bars 17 for lifting and lowering the upper mold half 11 relative to the lower mold half 12 which may be conventionally supported on a level floor, table or like support S.

The lower mold half 12 includes a central generally circular core 18 having an axial recess 20 in axial alignment with the axis of the gate 14. Radiating radially outwardly of the recess 20 are six channels 21, each of which is in alignment with one of the risers 16. The channels 21 open into the cavity 15 which is defined by a generally curved peripheral surface 22 of the core 18, a lower flat annular surface 23 of a flange 24 of the core 18, and an inner surface 25 of an outer annular wall 26.

Prior to positioning the upper mold half 11 upon an upper surface 27 of the outer annular wall 26 in the manner illustrated in phantom outline in FIG. 1, a hollow, tubular, generally circular element E is supported interiorly of the cavity 15 by a plurality of identical mounting means, each of which is generally designated by the reference numeral 30 in FIGS. 1 through 3 of the drawings. As is best illustrated in FIG. 2, the mounting means 30 are spaced from each other about the periphery of the wall 26 and are supported thereby in a manner which will be best understood by reference to FIGS. 2 and 3 of the drawings in particular.

Each of the mounting means 30 includes a hollow annular sleeve 31 to which is welded or otherwise conventionally secured a nut 32 into which is threaded an end portion 33 of a bolt 34 (FIG. 3). The bolt 34 passes through an opening 35 of the outer wall 26 and terminates at the exterior thereof in a bolt head 36. The bolt 34 preferably forms a friction fit with the opening 35 so that molten metal introduced into the cavity 15 will be incapable of passing through the space between the bolt 34 and the passage 35 to the exterior of the outer wall 26. As an alternative, suitable packing or sealing material may be positioned between the bolt 34 and the passage 35 to prevent the leakage of molten metal.

A plate 37 constructed from flexible metallic material includes a central opening 38 through which passes the bolt 34. The bolt head 36 rests against an outer face (unnumbered) of the plate 37. Opposite ends (unnumbered) of the plate 37 are provided with threaded apertures (unnumbered) and in each of which is threadably secured an Allen screw 40.

The mounting means 30 and the hollow element E are assembled by first sliding each of the sleeves 31 carrying the nuts 32 upon the hollow element E by merely telescoping the same over terminal ends 41, 42 of the hollow element E. At this time the bolts 34 are not threaded in the nuts 32, and the sleeves 31 are merely slid upon the hollow element E to generally the position thereof illustrated in FIG. 2. Thereafter the bolts 34 are inserted through the apertures 38 of the plate 37 and each passage 35 after which each bolt is threaded into an associated nut 32. Thereafter the screws 40 are threaded to the position shown in FIG. 2 to center the hollow element E within the cavity 15 in the manner illustrated in FIGS. 1 and 2, it being noted at this time that the ends 41, 42 are housed within the cavity 15 in generally superimposed relationship to each other. Obviously, if molten metal or similar flowable but solidifiable material were poured into the cavity 15, the same would enter the end portions 41, 42 which is obviously undesirable. Therefore, the ends 41, 42 are preferably provided with internal threads 43 (FIG. 6) and threaded into each end portion 41, 42 is an externally threaded steel plug 44 having an axial bore 45. The plugs 44 are inserted through tangential bores 46 (FIG. 2) in the outer wall 26 and thus place the interior of the hollow element E in fluid communication with atmosphere. Here again the plugs or inserts 44 are preferably in frictional engagement with the surface of the bores 46 to prevent the molten metal from escaping through the bore 46, but if necessary or desirable suitable sealing material, such as asbestos, may be positioned between the bore 46 and the exterior of the inserts 44 to prevent the escape of the molten metal outwardly of the cavity 15. As is best illustrated in FIG. 2, ends of the inserts 44 project into the cavity 15 and the axis of each insert 44 is coincident to the axis of the associated end portions 41, 42 of the hollow element E.

After the hollow element E has been positioned in the cavity 15 in the manner illustrated in FIG. 2, the upper mold half 11 is descended to the phantom outline position shown in FIG. 1 and molten metal, such as aluminum, is poured into the gate 14 and flows through the channels 21 filling the cavity 15 and the risers 16 in a conventional manner. The elevated temperature of the molten metal may produce steam or other gases internally of the hollow element E, and these are vented to atmosphere through the passages 45 of the inserts 44. Moreover, assuming that the hollow element E is formed of steel or any other material having a coefficient of expansion different from that of the aluminum or other molten metal, any relative expansion and/or contraction of the hollow element E relative to the metal in the cavity 15, as the latter solidifies, is compensated for by the sliding movement permitted to the hollow element E relative to the sleeves 31. Moreover, should the hollow element E expand to increase its normal diameter, the bolts 34 are free to move radially outwardly while during contraction of the hollow element E to a diameter less than its original diameter the resilient nature of the plates 37 permit the same to deflect to an outwardly opening bowed configuration thus permitting any contraction of the hollow element E. Moreover, the sleeves 31 are so closely fit upon the hollow element E that the molten metal cannot enter between the exterior surface of the hollow element E and the interior surface of each sleeve 31, and upon solidification of the molten metal relative sliding movement between the hollow element E and each of the sleeves 31 is effected when in use, as will be hereinafter more fully described. To positively assure such sliding movement an asbestos sleeve may be positioned between the tubular element E and each sleeve 31 thus preventing the molten metal from flowing between the hollow element E and the sleeves 31 during the casting operation.

After the casting has solidified and cooled the upper mold half 11 is removed and subsequently any excess material, as may have solidified in the riser 16 or the gate 14, is removed in a conventional manner. However, this is done only after the casting, which is generally designated by the reference numeral 50 in FIG. 5, has been removed from the lower mold half 12. In order to accomplish the removal of the casting 50 from the cavity 15, the bolts 34 are unthreaded from the nuts 32 which, due to the hexagonal outline thereof, are embedded in the casting and cannot rotate. Thus, each bolt 34 may be removed to free each casting from the outer wall 26 with the sleeves 31 and the bolts 32 embedded within the casting 50. Thereafter, the inserts 44, 44 are unthreaded from the end portions 41, 42 of the hollow element E and the outer wall 26, which may be of a sectional construction, i.e., two semi-annular halves, is removed to permit the removal of the casting 50 from the cavity 15 for subsequent finishing and machining, as might be necessary.

Reference is now particularly made to FIG. 5 wherein two of the castings 50, 50 formed in the mold 10 are illustrated, with the castings being positioned one atop the other to define a matrix which is generally designated by the reference numeral 51 having an outer peripheral surface 52 and an inner peripheral surface 53 defining a cavity 54 adapted to receive a tire for subsequent recapping, vulcanizing and the like. The castings 50, 50 are suitably secured to each other during a recapping operation.

By virtue of the use of the inserts 44, 44 during the molding of the castings 50, the same are provided in the peripheries 52 thereof with voids or recesses 55, 56, each of which has an axis in coincidence with the respective end portions 41, 42 of the hollow element E. If, for example, the matrix 51 is to be heated by steam, hot water or similar heated media, a nipple 57 is threaded into each of the thread portions 43 of the end portions 41, 42, and steam, hot water, or the like may be introduced into and removed from the hollow element E in the manner indicated in FIG. 6. However, if instead it is desired to heat the matrix 51 by electrical energy, a conventional calrod 58 is telescoped through the hollow element E and opposite ends thereof 60, 61 are secured to the interior threads 43 of the hollow element end portions 41, 42. Suitable terminals 62, 63 are accessible through the voids 55, 56 for connection to an electrical energy source.

The calrod or similar heating element 58 is preferably provided along its length with a plurality of annular washer-like spacers 64 which prevent the heating element 58 from actually coming into contact with the inner walls of the hollow metallic element E. However, the spacers 64 are provided with sufficient clearance to allow for the heating element 58 to expand and contract. If desired, before the ends 41, 42 are closed by the threaded elements 60, 61, the hollow element E may be filled with any good, practical heat transfer agent such as high temperature, nonflammable oil or powdered metal, such as aluminum or powdered graphite. Of course, the liquid would be preferable since it would eliminate any air pockets thereby giving positive heat transfer as well as protecting the heating element 58 from atmosphere and thus eliminating oxidation.

From the foregoing, and particularly a comparison of FIGS. 6 and 7, it is also to be noted that the castings 50 can be readily converted from electrical-type heaters to steam-type heaters merely by interchanging the heater 58 of FIG. 7 with the nipples 57 of FIG. 6. This convertibility is highly desirable. Furthermore, due to the absence of bends in the hollow element E, the heating element 58 can be readily inserted completely through the hollow element E after the castings 50, 50 have been formed, and need not be housed in the hollow element E during the casting operation wherein the elevated temperatures of the molten metal could adversely affect the same.

Though the absence of abrupt bends is an important object of constructing the castings 50, 50 in the manner heretofore described, reference is made to FIG. 4 which illustrates a mold identical to the mold of FIGS. 1 though 3, except in the present case a side wall 66 thereof is provided with radial passages or bores 67, 68 through which project radial terminal ends 70, 71 of another hollow tubular element E'. The end portions 70, 71 are preferably wrapped in asbestos or asbestos sleeves 72 to prevent the molten metal from flowing outwardly through the passages 67, 68, as well as to permit the end portions 70, 71 to slide radially in the passages 67, 68 during expansion or contraction of the tubular element E'. Furthermore, though the end portions 70, 71 are illustrated as integral portions of the circular hollow element E', the same may be separate pieces or fitments welded to the hollow element E' at the 90° bend thereof. Whereas such conventionally welded structures might rupture due to expansion and contraction when in use, the manufacture of the casting in the manner heretofore described which permits the relative sliding movement due to the sleeves 31 will virtually preclude such rupture at the welds. Thus, though not illustrated in FIGS. 4 and 5, the hollow elements E and E' include within the castings 50, 50, the sleeves 31 and the nuts 32 to permit the contraction and expansion heretofore noted.

While the present invention has been described particularly in the manufacture of annular matrices 51 or similar heating devices, the manner in which relative movement of the hollow element E relative to a casting by virtue of the sleeve 31 being embedded therein may be employed in any type of heating device. As an example, a mold could be constructed of a generally triangular configuration with a like contoured hollow element being disposed therein and supported by comparable mounting means 30. When the casting formed therein has solidified an electrical heater could be installed, as in the case of FIG. 7, to use the casting as the base of a conventional electric iron. Moreover, by merely molding completely solid circular or rectangular plates one could construct such appliances a hot-plates, percolator heaters, etc., merely by incorporating therein comparable electric heating devices, such as the heating device 58. However, in any such case the relative sliding movement provided between the hollow elements and the casting body per se by virtue of the embedded sleeve 31 precludes damage irrespective of the differences in coefficients of expansion between the material from which the hollow elements are constructed and the casting material.

Though the hollow element E has been described as being preferably formed of steel while the molten metal introduced into the cavity 15 has been described as aluminum, it is to be understood that changes in these materials are within the scope of this invention. For example, the hollow elements E may be formed of copper and for that matter need not be constructed from metallic material as also need not the molten material introduced into the cavity 15. Insofar as the present invention is concerned, the hollow elements E may be constructed of most any type material so long as the melting point thereof is higher than the melting point of the molten material poured into the mold 15.

While preferred forms and arrangements of parts have been shown in illustrating the invention, it is to be clearly understood that various changes in details and arrangement of parts may be made without departing from the spirit and scope of this disclosure.

I claim:
1. A method of manufacturing a casting comprising the steps of providing a mold having a cavity of a predetermined configuration, positioning an element wholly within said cavity, supporting said element for sliding movement relative to said cavity, filling said cavity with flowable material, solidifying said flowable material whereby said relative sliding movement is provided at least during the solidification of said flowable material, and including the step of preventing the flowable material from entirely encapsulating the element whereby a portion thereof is exposed through a void of the solidified material.

2. A method of manufacturing a casting comprising the steps of providing a mold having a cavity of a predetermined configuration, positioning an element wholly within said cavity, supporting said element for sliding movement relative to said cavity, filling said cavity with flowable material, solidifying said flowable material whereby said relative sliding movement is provided at least during the solidification of said flowable material, said element is hollow, and including the step of venting the interior of the hollow element to atmosphere at least during the solidification of the flowable material.

3. A method of manufacturing a casting comprising the steps of providing a mold having a cavity of a predetermined configuration, positioning an element wholly within said cavity, supporting said element for sliding movement relative to said cavity, filling said cavity with flowable material, solidifying said flowable material whereby said relative sliding movement is provided at least during the solidification of said flowable material, said cavity is of an annular configuration, said element is of a circular configuration, and said method includes the further step of preventing the flowable material from entirely encapsulating the element whereby a portion thereof is exposed through a void of the solidified material.

4. The mold as defined in claim 3 wherein said preventing step is performed by positioning an insert against said end portion in spanning relationship to a portion of said cavity and into said mold prior to filling the cavity with the flowable material.

5. The mold as defined in claim 4 wherein said circular element is hollow and said insert includes an opening for venting the circular element to atmosphere during the formation of the casting.

6. The mold as defined in claim 4 wherein the end portion of the circular element is in generally tangential relationship to the annular mold cavity.

7. A method of manufacturing a casting comprising the steps of providing a mold having a cavity of a predetermined configuration, positioning a hollow element wholly within the cavity, placing the hollow element in fluid communication with atmosphere by means of a hollow member at least partially spanning said cavity and opening to atmosphere, filling said cavity with flowable material to encapsulate a major portion of the hollow element and a portion of the hollow member, solidifying the flowable material, and removing the hollow member from the hollow element and the solidified material thereby forming a void in the latter through which is rendered accessible the interior of the hollow element.

8. The method as defined in claim 7 wherein said cavity is of an annular configuration and said hollow member is of a generally circular configuration having opposite ends, and the step of placing the hollow element in fluid communication with atmosphere is performed by temporarily securing the hollow member to at least one of said opposite ends.

9. The method as defined in claim 8 wherein said at least one end is disposed in generally tangential relationship to said annular cavity.

10. A method of manufacturing a casting comprising the steps of providing a mold having a cavity of a predetermined configuration, assembling a plurality of individual sleeves in external telescopic sliding relationship to an element, positioning said sleeves and at least a portion of said element in the cavity, supporting each sleeve individually by a rod secured thereto passing through said mold, filling the cavity with hot flowable material having a coefficient of expansion different than that of said element, and solidifying said flowable material whereby relative sliding movement is provided during and after the solidification thereof.

11. The method as defined in claim 10 including the step of sliding the sleeves individually along the element for assembly as well as for positioning each sleeve relative to its associated supporting rod.

12. The method as defined in claim 11 wherein said cavity is of an annular configuration, said element is of a generally circular configuration, and ends of said circular element project tangentially outwardly of said cavity.

13. The method as defined in claim 10 wherein said element is wholly housed within said cavity and including the step of preventing the flowable material from entirely encapsulating the element whereby a portion thereof is exposed through a void of the solidified material.

14. The method as defined in claim 10 wherein said element is hollow and is wholly housed within said cavity, and including the step of venting the interior of the hollow element to atmosphere at least during the solidification of the flowable material.

15. The method as defined in claim 10 wherein said cavity is of an annular configuration, said element is of a circular configuration, said element is wholly housed within said cavity, and said method includes the further step of preventing the flowable material from entirely encapsulating the element whereby a portion thereof is exposed through a void of the solidified material.

16. The method as defined in claim 10 including the step of disassembling the sleeves and rods after the solidification of said flowable material.

17. The method as defined in claim 16 including the step of threadedly securing each sleeve to its associated rod whereby disassembly thereof occurs through an unthreading action.

18. A method of manufacturing a casting comprising the steps of providing a mold having a cavity of a predetermined configuration, positioning an element wholly within said cavity, filling said cavity with flowable material, said cavity being of an annular configuration and said element is of a generally circular hollow configuration, preventing the flowable material from entirely encapsulating the element, said last-mentioned step being performed by plugging the ends of the hollow element with a member which at least partially spans the cavity, and solidifying said flowable material.

19. The method as defined in claim 18 wherein said plugging members project tangentially outwardly of said cavity thereby defining generally tangential voids upon the removal thereof from the exterior of the casting.

* * * * *